(12) United States Patent (10) Patent No.: US 8,020,051 B2
Ziegler (45) Date of Patent: Sep. 13, 2011

(54) MESSAGE HANDLING IN A SERVICE-ORIENTED ARCHITECTURE

(75) Inventor: Carsten Ziegler, Walldorf (DE)

(73) Assignee: SAP AG, Walldorf (DE)

( * ) Notice: Subject to any disclaimer, the term of this patent is extended or adjusted under 35 U.S.C. 154(b) by 344 days.

(21) Appl. No.: 12/254,689

(22) Filed: Oct. 20, 2008

(65) Prior Publication Data

US 2010/0100777 A1 Apr. 22, 2010

(51) Int. Cl.
*G06F 11/00* (2006.01)

(52) U.S. Cl. ........... 714/57; 709/203; 709/230; 709/246

(58) Field of Classification Search .................... 714/57
See application file for complete search history.

(56) References Cited

U.S. PATENT DOCUMENTS

| | | | | |
|---|---|---|---|---|
| 2003/0061857 A1* | 4/2003 | Keller | ........................... | 73/1.01 |
| 2004/0006744 A1* | 1/2004 | Jones et al. | .................. | 715/514 |
| 2004/0039964 A1* | 2/2004 | Russell et al. | ................. | 714/25 |
| 2005/0204048 A1* | 9/2005 | Pujol et al. | .................... | 709/229 |
| 2006/0012672 A1* | 1/2006 | Schrader et al. | ........... | 348/14.08 |
| 2006/0026467 A1* | 2/2006 | Nehab et al. | ..................... | 714/38 |
| 2006/0212593 A1* | 9/2006 | Patrick et al. | ................. | 709/230 |
| 2006/0242195 A1* | 10/2006 | Bove et al. | ................ | 707/103 R |
| 2007/0067494 A1* | 3/2007 | Savchenko et al. | ........... | 709/246 |
| 2007/0168753 A1* | 7/2007 | Herter et al. | .................... | 714/42 |
| 2007/0240125 A1* | 10/2007 | Degenhardt et al. | .......... | 717/129 |
| 2008/0028084 A1* | 1/2008 | Bloching et al. | ............... | 709/229 |
| 2008/0170579 A1* | 7/2008 | Chafle et al. | .................... | 370/401 |
| 2008/0244616 A1* | 10/2008 | Brunswig et al. | ............. | 719/315 |
| 2009/0112887 A1* | 4/2009 | Weber et al. | ................... | 707/100 |
| 2009/0150981 A1* | 6/2009 | Amies et al. | ....................... | 726/5 |
| 2009/0177692 A1* | 7/2009 | Chagoly et al. | ............ | 707/104.1 |
| 2009/0177957 A1* | 7/2009 | Bouillet et al. | ............... | 715/230 |

\* cited by examiner

*Primary Examiner* — Scott T Baderman
*Assistant Examiner* — Chae Ko
(74) *Attorney, Agent, or Firm* — Mintz, Levin, Cohn, Ferris, Glovsky and Popeo, P.C.

(57) ABSTRACT

A service call to a backend system is initiated by a user interface in a service-oriented architecture. Thereafter, a service answer is received from the backend system encapsulating a backend error object. The backend error object is mapped to a front end error object. A front end error message can later be presented to a user in the user interface that is derived from the front end error object. Related apparatus, systems, techniques and articles are also described.

20 Claims, 5 Drawing Sheets

| Backend Service ID | Backend Service Name | Backend Error Object | Backend Error Preview | Front End Error Object | Front End Error Preview | Create New Error Object/Define Mapping |
|---|---|---|---|---|---|---|
| DO_123 | | BE1 | Business Partner &Business_Partner& unknown. | | Business Partner &Business_Partner& unknown. | ⇧ |
| DO_XYZ | | BE2 | A message with &a_variable& and &another_variable& | FE1 | A message with &a_mapped_variable& and &a_replaced_variable& | ⇧ |
| DO_ANYTHING | | BE1 | Business Partner &Business_Partner& unknown. | FE2 | Customer &Business_Partner& unknown. | ⇧ |
| DO_ANYTHING | | BE3 | No Title maintained. | | No Title maintained. | ⇧ |
| | | | | | | |
| | | | | | | |
| | | | | | | |

MESSAGE HANDLING IN A SERVICE-ORIENTED ARCHITECTURE

TECHNICAL FIELD

The subject matter described herein relates to the handling of messages in a service-oriented architecture.

BACKGROUND

Problems can arise with message handling in a service-oriented architecture in which a backend system contains business logic that is exposed in services. Calling the services with data or several services in a specific order can result in errors. As a result, the services return information about the error. However, such information is returned using terminology defined by the backend system which may not always be useful for a front end system user interface (which may use differing terminology).

As an example, a backend system can be characterized as a generic platform that exposes business administrative services for financial and human resources applications. On top of the backend system there is a specific front end system for a small business to manage a human resources process. The more generic error information about the backend system may overextend the capabilities of the business owner as such error information is not tailored to the human resources process.

SUMMARY

In one aspect, a service call to a backend system is initiated by a user interface in a service-oriented architecture. Thereafter, a service answer is received from the backend system encapsulating a backend error object. The backend error object is latter mapped to a front end error object so that a front end error message derived from the front end error object is presented in the user interface.

The mapping can include accessing a mapping table mapping backend error objects to front end error objects. The mapping table can include additional information relating to the front end error message such as a backend error preview for each backend error object, and a front end error preview characterizing the front end error message.

The backend error object can include a short text description characterizing an error and a long text description characterizing the error, the long text description containing more characters than the short text description. The backend error object can additionally characterize a severity of a corresponding error.

In some implementations, a service can be initiated by the user interface that is based on variables encapsulated in the backend error object to obtain error information to include in the front end error message (which can optionally be in addition to front end error message information contained within the front end error object).

The front end error object can include all attributes of the backend error object or it can include only a portion of such attributes. In the latter arrangement, additional attributes only present in the front end error object can be used to generate the front end error message. In some variations, the back end error object can be configured such that the back end error message cannot be overrun (thereby requiring the user interface layer to present the back end error message without modification).

In an interrelated aspect, a front end system comprising a user interface is coupled to a backend system via a communications protocol such as TCP/IP in a service-oriented architecture. With such a system, the front end system can initiate a service call to the backend system via the user interface which results in the backend system generating a service answer to the service call that includes a backend error object. The front end system can map the backend error object to a front end error object so that a front end error message can be presented in the user interface. Such a front end error message is based on the front end error object and is different than a backend error message included in the backend error object.

Articles are also described that comprise a machine-readable storage medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, by using front end error objects that are mapped to backend error objects, user interfaces that expose backend services can have customized error messages which are tailored for a particular context (i.e., application, type of user, etc.).

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 6 illustrates a sample mapping table.

Like reference symbols in the various drawings indicate like elements.

DETAILED DESCRIPTION

Figure 1:
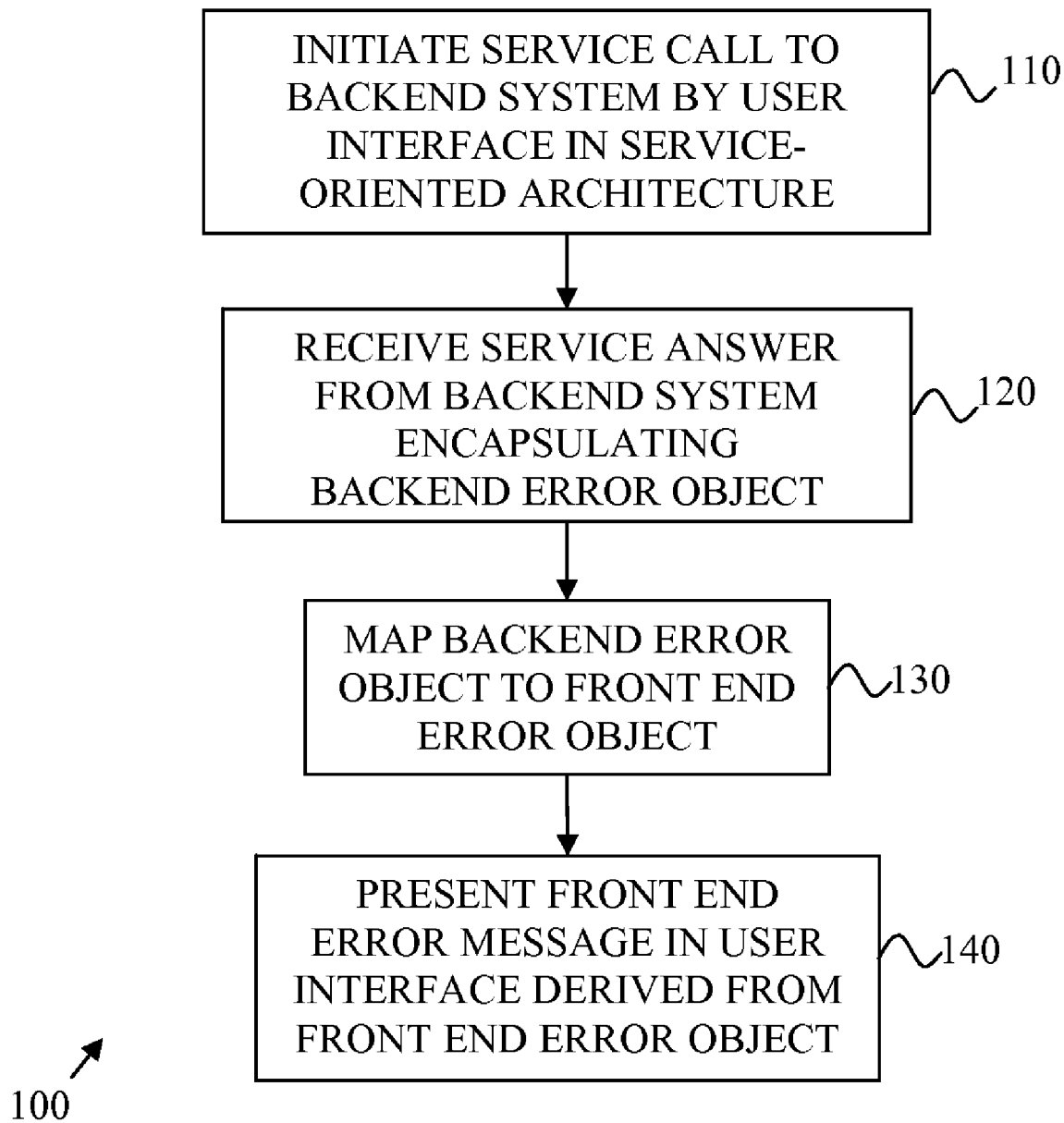
FIG. 1 is a process flow diagram illustrating error message handling by a user interface in a service-oriented architecture.

FIG. 1 is a process flow diagram illustrating a method 100 in which, at 110, a service call to a backend system is initiated by a user interface in a service-oriented architecture. Thereafter, at 120, a service answer is received from the backend system encapsulating a backend error object. The backend error object is mapped, at 130, to a front end error object. A front end error message can later, at 140, be presented to a user in the user interface that is derived from the front end error object. The derivation can be based on, for example, variables in the front end error object.

Figure 2:
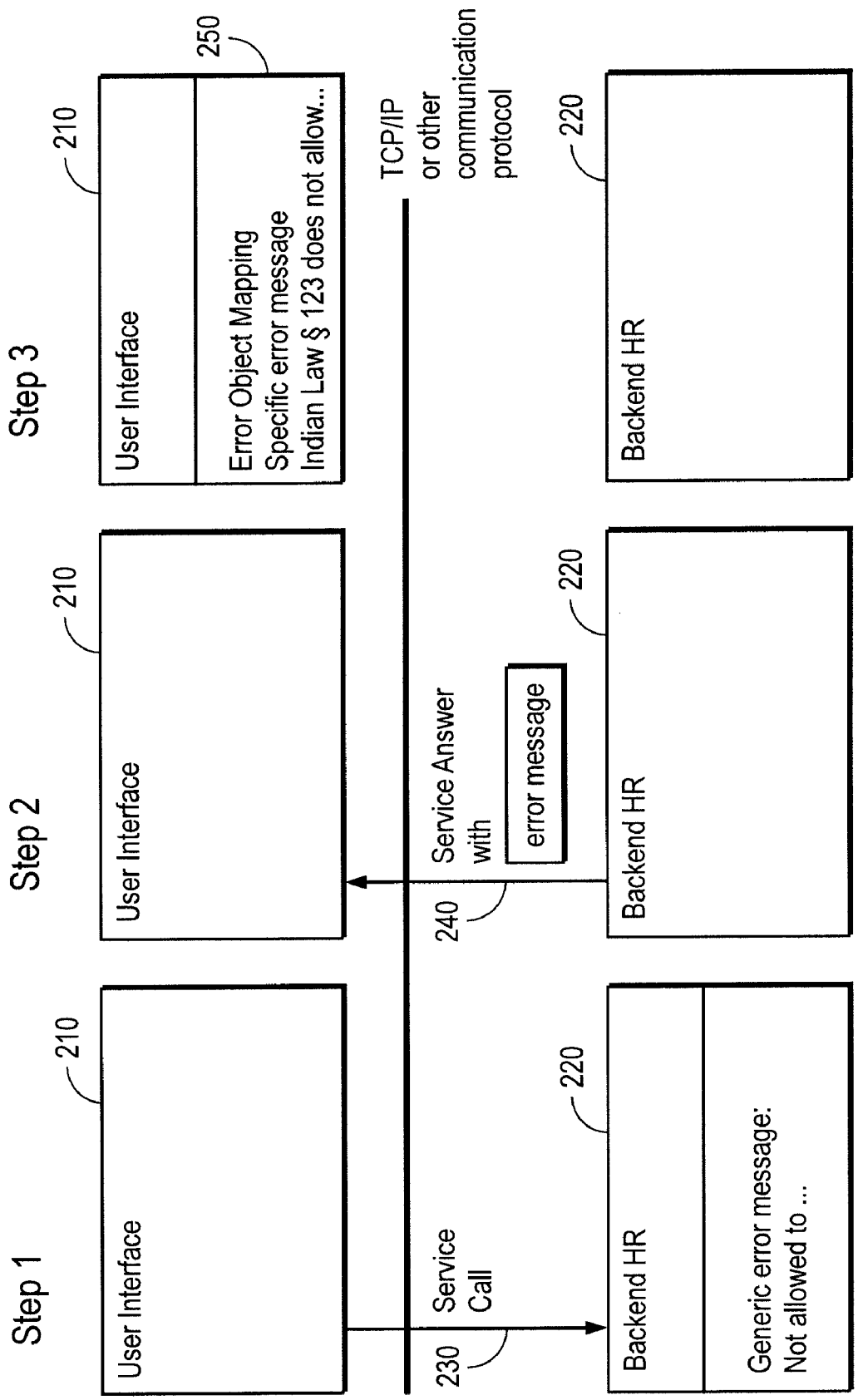
FIG. 2 is a diagram illustrating a service call, a service answer, and presentation of an error messages in a user interface.

FIG. 2 is a diagram 200 that illustrates a three step process in which a user interface 210 initiates a service call 230 with a backend system 220 via a protocol such as TCP/IP which is subsequently answered 240. An error object is modeled in the backend system 220 that can have error text (e.g., short error text, long error text, etc.) and error severity. The error text can contain variables that are described in such a way that the purpose of each such variable is readily apparent. For example, the variable can be described by a type and a corresponding business semantic. In some implementations, message text in an error message can be translated.

After the initiation of the service call 230, the backend system 220 returns a backend error object in the service answer 240 to the user interface 210. The service model can contain the error model as part of the service interface. The user interface 210 can then present a front end error message 250 to a user via the user interface 210.

The user interface 210 can define its own front end error objects for new messages that are specific to the user interface. The user interface 210 can also connect its own front end error objects to the backend error objects from the backend system 220. Connecting, in this context, means that when modeling a front end error object at the user interface 210, a reference to a backend system error model can be created. Such an arrangement allows for the direct reuse of a backend system error model that utilizes all of the corresponding attributes (e.g., text, severity, variables, etc.) and/or for the reuse of some of the attributes and modification of other attributes (e.g., text, variables, etc.).

The current techniques allow for the user interface 210 to develop a replacement mechanism that works in a manner that backend error objects can be easily replaced by front end error objects. Having a semantic description of the variables associated with such error objects allows for the creation of new message texts that use at least a portion of the variables. Helper services can be used to dynamically enrich an error message presented to a user at the user interface 210.

Figure 3:
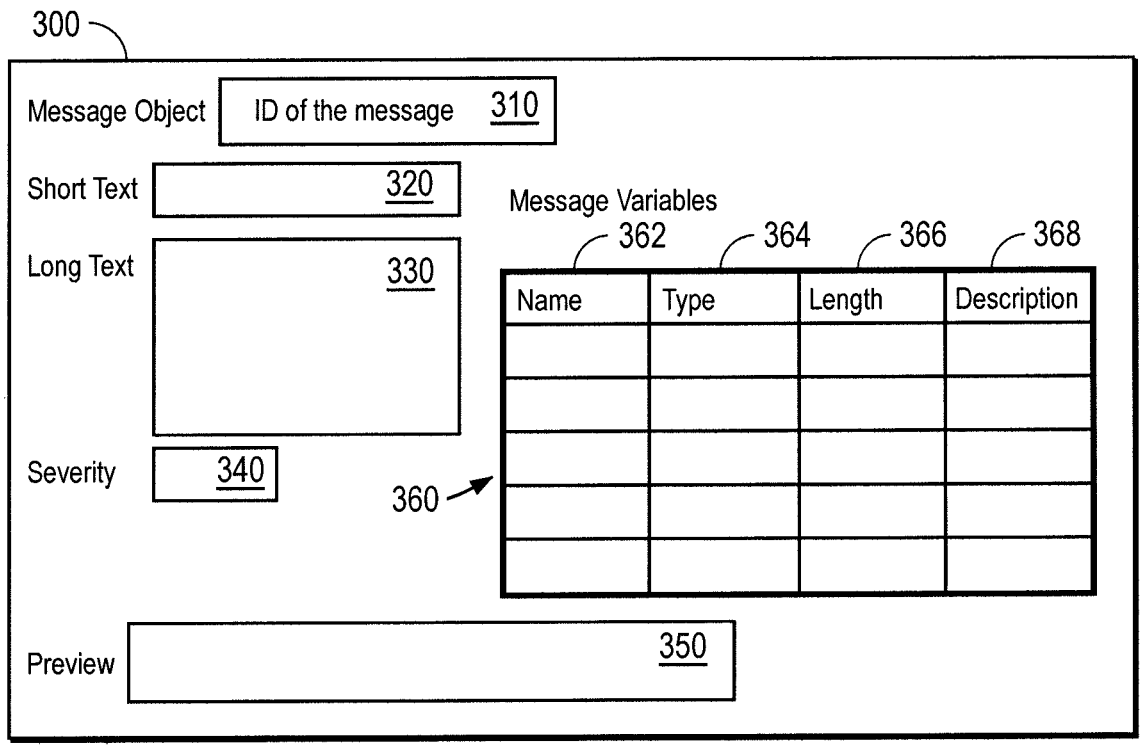
FIG. 3 illustrates a backend object template.

FIG. 3 illustrates a template message object 300 that can be modeled in a backend system. The template message object 300 can include an ID field 310 for an ID of a corresponding message (e.g., a universally unique identifier), a short text field 320 that includes a limited number of characters that can be used to describe the message, a long text field 330 that includes a greater number of characters that can be used to describe the message in more detail, a severity field 340 which characterizes the corresponding message, a preview field 350 which can provide a preview of the message, and a variables table 360. Error text in a message can include variables that are described in such a way that the purpose of each variable is clear. The variables table 360, for example, can include columns 362, 364, 366, 368 that respectively characterize a name of each variable, a type of each variable, a length of each variable, and a description of each variable. Such information can be useful in case the message text obtained from the message object 300 is later translated.

Figure 4:
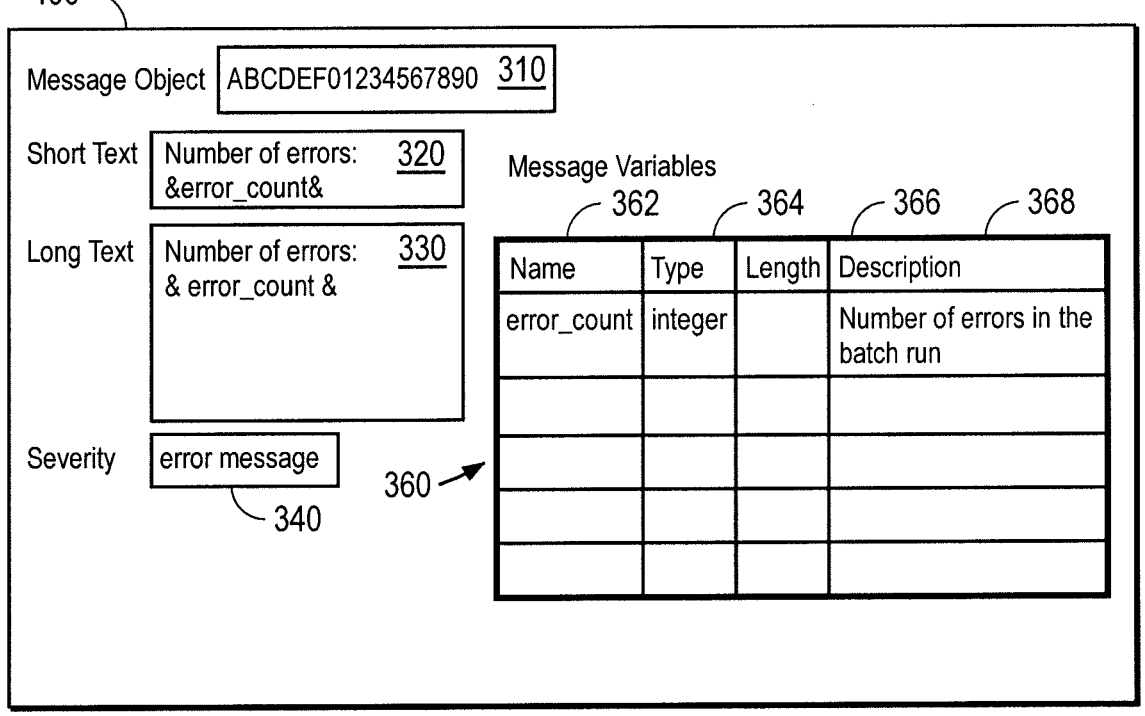
FIG. 4 illustrates a sample backend object based on the backend object template of FIG. 3.

FIG. 4 shows a message object 400 in which the fields of the template message object 300 are populated with information. For example, ID field 310 is populated with a unique ID for the message object, short text field 320 and long text field 330 both include information characterizing a type of error, severity field 340 characterizes the message object 400 as relating to an error message and the message variables table 360 includes an integer variable relating to error count in a batch run.

Figure 5:
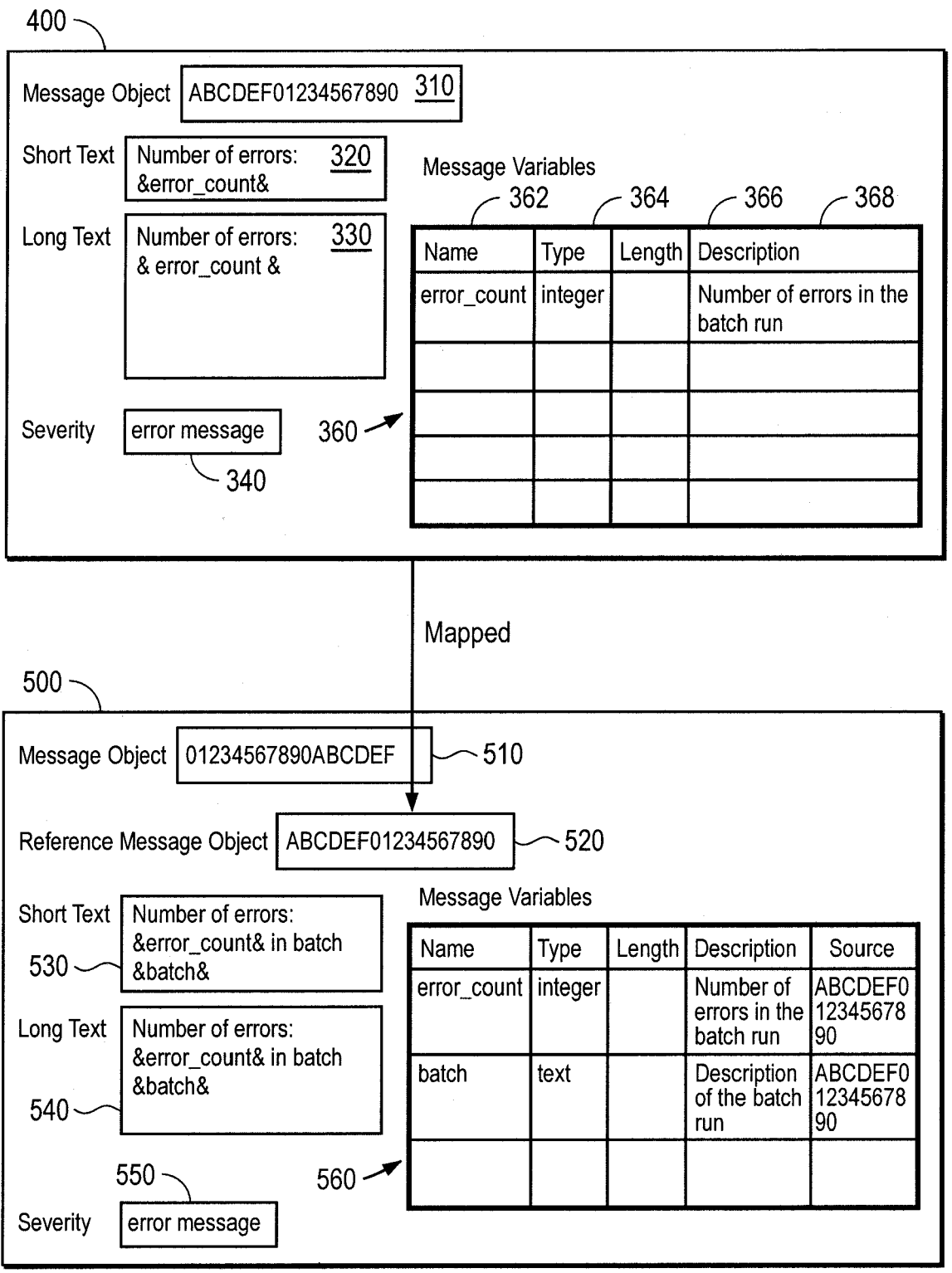
FIG. 5 illustrates mapping of the sample backend object of FIG. 4 to a front end object.

FIG. 5 illustrates how the message object 400, which can be used to generate a backend message that is returned from a service, is mapped to a front end message object 500 (which in turn can be used to generate a front end message presented to a user). The front end message object 500 can include an ID field 510 which provides a unique identifier for the front end message object 500, a reference message object field 520 which maps to the message object field 310 of the message object 400, a short text field 530 which describes a number of errors in a batch run (obtained from the message generated using message object 400) and the batch run in a limited number of characters, a long text field 540 which describes the number of errors in the batch run (obtained from the message generated using message object 400) and the batch run in a greater number of characters, and a message variables table 560 that includes two variables, one variable relating to the error count obtained from the message generated using message object 400, and another variable relating to a description of the batch run (which could be obtained, for example, via a separate service).

FIG. 6 illustrates a sample mapping table 600 which includes columns for Backend Service ID, Backend Service name, Backend Error Object, Backend Error Preview, Front End Error Object, Front End Error Preview, and Create new Error Object/Define Mapping. As can be appreciated, the mapping table 600 can be used to define front end error messages by mapping corresponding front end error objects to backend error objects.

The subject matter described herein can be used for a generic mapping environment for message customization for various front end systems of service-consuming applications as part of modeling infrastructure. Mappings of backend system error objects to front end error objects can maintain their corresponding references so that the front end system message error objects can benefit from updates of the backend system message error objects. In addition, in some variations, backend error objects can define what attributes can be used in what way (e.g., is the attribute allowed to change the text or variable content, etc.). The backend error objects can be define whether they can be mapped to front end error objects. For example, with some deployments, it may be desirable to prevent the modification of error messages in the user interface layer.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In addition, while the foregoing generally relates to error messages, it can be appreciated that the current subject matter can be used in connection with any arrangement in which it is desirable to modify a message generated by a backend system for presentation to a user on a front end system. Other embodiments may be within the scope of the following claims.

What is claimed is:

1. An article comprising a non-transitory machine-readable storage medium embodying instructions that when performed by one or more machines result in operations comprising:
   initiating a service call to a backend system by a user interface in a service-oriented architecture;
   receiving a service answer from the backend system encapsulating a backend error object;
   mapping the backend error object to a front end error object; and
   presenting a front end error message derived from the front end error object in the user interface;
   wherein the backend error object contains variables that are each described by a type and a corresponding business semantic, the variables being used to generate the front end error object.

2. An article as in claim 1, wherein the mapping comprises accessing a mapping table mapping backend error objects to front end error objects.

3. An article as in claim 2, wherein the mapping table comprises a backend error preview for each backend error object.

4. An article as in claim 2, wherein the mapping table comprises a front end error preview characterizing the front end error message.

5. An article as in claim 1, wherein the backend error object comprises a short text description characterizing an error and a long text description characterizing the error, the long text description containing more characters than the short text description.

6. An article as in claim 1, wherein the backend error object characterizes a severity of a corresponding error.

7. An article as in claim 1, wherein the tangible machine-readable storage medium further embodies instructions that when performed by one or more machines result in operations comprising:
   initiating, by the user interface, a service based on variables encapsulated in the backend error object to obtain error information to include in the front end error message.

8. An article as in claim 1, wherein the front end error object includes all attributes of the backend error object.

9. An article as in claim 1, wherein the front end error object includes a subset of attributes of the backend error object and additional attributes not included in the backend error object.

10. An article as in claim 1, wherein a backend error message in the backend error object cannot be overrun and is required to be presented in the front end error message.

11. A computer-implemented method comprising:
    initiating a service call to a backend system by a user interface in a service-oriented architecture;
    receiving a service answer from the backend system encapsulating a backend error object;
    mapping the backend error object to a front end error object; and
    presenting, in the user interface, a front end error message derived from variables in the front end error object;
    wherein the backend error object contains variables that are each described by a type and a corresponding business semantic, the variables being used to generate the front end error object.

12. A method as in claim 11, wherein the mapping comprises accessing a mapping table mapping backend error objects to front end error objects.

13. A method as in claim 12, wherein the mapping table comprises a backend error preview for each backend error object.

14. A method as in claim 12, wherein the mapping table comprises a front end error preview characterizing the front end error message.

15. A method as in claim 11, wherein the backend error object characterizes a severity of a corresponding error.

16. A method as in claim 11 further comprising:
    initiating, by the user interface, a service based on variables encapsulated in the backend error object to obtain error information to include in the front end error message.

17. A method as in claim 11, wherein the front end error object includes all attributes of the backend error object.

18. A method as in claim 11, wherein the front end error object includes a subset of attributes of the backend error object and additional attributes not included in the backend error object.

19. A method as in claim 11, wherein the backend error object comprises a short text description characterizing an error and a long text description characterizing the error, the long text description containing more characters than the short text description.

20. A system comprising:
    a front end system comprising a user interface; and
    a backend system coupled to the front end system via TCP/IP in a service-oriented architecture;
    the front end system initiating a service call to the backend system via the user interface;
    the backend system generating a service answer to the service call that includes a backend error object;
    the front end system mapping the backend error object to a front end error object so that a front end error message derived from the front end error object can be presented in the user interface, the front end error message being different than a backend error message included in the backend error object;
wherein the backend error object consists of:
an ID field for an identification for a corresponding message;
a short text field that includes a first number of characters to describe the corresponding message;
a long text field that includes a second number of characters to describe the corresponding message, the second number being greater than the first number;
a severity field that characterizes a severity of the corresponding message;
a preview field that includes a preview of the message;
a variables table containing variables that includes an identification of each variable, a type of each variable, a length of each variable, and a description of each variable.

* * * * *